(12) United States Patent
Bosman (10) Patent No.: US 11,454,294 B2
(45) Date of Patent: Sep. 27, 2022

(54) ADJUSTABLE VIBRATION ABSORBER FOR A PERSONAL CARE DEVICE

(71) Applicant: KONINKLIJKE PHILIPS N.V., Eindhoven (NL)

(72) Inventor: Franciscus Jozef Bosman, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 320 days.

(21) Appl. No.: 16/633,380

(22) PCT Filed: Jul. 25, 2018

(86) PCT No.: PCT/EP2018/070115
§ 371 (c)(1),
(2) Date: Jan. 23, 2020

(87) PCT Pub. No.: WO2019/025249
PCT Pub. Date: Feb. 7, 2019

(65) Prior Publication Data
US 2020/0232535 A1 Jul. 23, 2020

Related U.S. Application Data

(60) Provisional application No. 62/539,006, filed on Jul. 31, 2017.

(51) Int. Cl.
*A46B 13/02* (2006.01)
*A46B 15/00* (2006.01)
(Continued)

(52) U.S. Cl.
CPC ............... *F16F 15/03* (2013.01); *A46B 9/04* (2013.01); *A46B 13/023* (2013.01);
(Continued)

(58) Field of Classification Search
CPC .............. A46B 13/023; A46B 15/0026; A61C 17/3481; F16F 15/03; F16F 2222/06; H02K 33/18
See application file for complete search history.

(56) References Cited

U.S. PATENT DOCUMENTS 5,189,751 A   3/1993  Giuliani et al.
5,736,798 A   4/1998  O'Brien et al.
(Continued)

FOREIGN PATENT DOCUMENTS

CN   102545412 A   7/2012
DE     1812909 U   6/1960
(Continued)

OTHER PUBLICATIONS

International Search Report and Written Opinion, International Application No. PCT/EP2018/070115, dated Feb. 7, 2019.

*Primary Examiner* — Randall E Chin (57) ABSTRACT

A vibration reduction assembly (200) including: (i) a shaft (240); (ii) a first component (210) positioned along the shaft and having a first face (212) comprising a plurality of magnets (230) positioned to alternate between a magnet having a first magnetic pole (232) at the first face and a magnet having the opposite magnetic pole (234) at the first face; and (iii) a second component (220) positioned along the shaft and having a first face (222) comprising a plurality of ferromagnetic extensions (260), wherein the first face of the first component is separated from the first face of the second component by a gap (280) having an adjustable first distance, and wherein a pair of the plurality of magnets interact via magnetic force with a respective one of the ferromagnetic extensions to reduce vibrations from a drivetrain to a housing portion of the personal care device.

20 Claims, 7 Drawing Sheets

(51) Int. Cl.
 *A61C 17/34* (2006.01)
 *F16F 15/03* (2006.01)
 *A46B 9/04* (2006.01)

(52) U.S. Cl.
 CPC ...... *A46B 15/0026* (2013.01); *A61C 17/3481* (2013.01); *F16F 2222/06* (2013.01); *F16F 2230/0005* (2013.01)

(56) References Cited

U.S. PATENT DOCUMENTS

| | | | |
|---|---|---|---|
| 6,105,943 | A | 8/2000 | Nagasawa |
| 8,970,072 | B2 | 3/2015 | Headstrom |
| 9,301,822 | B2 | 4/2016 | Grez et al. |
| 2006/0255665 | A1* | 11/2006 | Kraus .................... H02K 33/18 310/36 |
| 2010/0154151 | A1* | 6/2010 | Grez ...................... A61C 17/32 15/22.1 |
| 2010/0313425 | A1 | 12/2010 | Hawes |
| 2014/0259473 | A1* | 9/2014 | Bax ........................ A61C 17/22 267/136 |
| 2017/0100224 | A1 | 4/2017 | Wills et al. |

FOREIGN PATENT DOCUMENTS

| | | |
|---|---|---|
| EP | 2139102 A1 | 12/2009 |
| WO | 2004047670 A1 | 6/2004 |
| WO | 2016119136 A1 | 8/2016 |

\* cited by examiner

ADJUSTABLE VIBRATION ABSORBER FOR A PERSONAL CARE DEVICE

This application is the U.S. National Phase application under 35 U.S.C. § 371 of International Application No. PCT/EP2018/070115, filed on 25 Jul. 2018, which claims the benefit of U.S. Provisional Application No. 62/539,006, filed 31 Jul. 2017. These applications are hereby incorporated by reference herein.

FIELD OF THE INVENTION

The present disclosure is directed generally to an adjustable vibration absorber for a personal care device drivetrain assembly.

BACKGROUND

Electric personal care devices, such power toothbrushes, shavers, face cleansers, and similar devices, have motor that engages a drivetrain in order to drive a head mechanism in an oscillating, reciprocating, or other pattern. The devices also include a resonator, which is a component of the drivetrain that converts the oscillatory force of the motor into rotational movement. The actuator force excites the resonance of the system, which ensures high rotational amplitude at low input power. Some devices comprise a mechanical resonator, which includes a mechanical spring. Together with the inertia of the system, the mechanical spring defines the natural frequency of the system. Other devices comprise a magnetic resonator, which includes a magnetic spring. The magnetic spring attracts iron in the actuator, and the magnitude of attraction is related to the distance between the magnet and the iron, creating a magnetic equivalent to a mechanical spring. Together with the driven inertia, the magnetic spring defines the natural frequency of the system.

Since resonant actuators can transfer unwanted vibrations to the handle of the personal care device that can be felt by users in operation, and can be perceived as unwanted, many personal care devices utilize vibration cancellation. For example, some motors are suspended or otherwise engaged with springs to cancel vibrations. However, these vibration cancellation methods add complexity to the personal care device, and do not adjust to the unique operating frequency of each individual personal care device, thereby decreasing the effectiveness of the cancellation.

Accordingly, there is a need for an adjustable vibration absorber to reduce unwanted vibrations generated by the drivetrain of a personal care device.

SUMMARY OF THE INVENTION

The present disclosure is directed to inventive vibration reduction assemblies comprising an adjustable vibration absorber. Applied to a powered personal care device such as an electric toothbrush, face cleanser, or shaver, the inventive systems provide a vibration reduction assembly capable of adjusting to the unique operating frequency of the device, thereby reducing unwanted vibration. The vibration reduction assembly comprises a first component having a radial magnetization pattern of alternating poles, and a second component comprising a ferromagnetic material with a radial pole structure to form a vibration cancellation mechanism for the resonant system. The first component and the second component are separated by an air gap having an adjustable distance, where adjusting the air gap adjusts or fine tunes the stiffness of the rotational magnet and thus adjusts or fine tunes the vibration cancellation mechanism.

Generally in one aspect, a vibration reduction assembly for a personal care device is provided. The vibration reduction assembly includes: (i) a shaft; (ii) a first component positioned along the shaft and having a first face comprising a plurality of magnets, wherein the plurality of magnets are positioned to alternate between a magnet having a first magnetic pole at the first face and a magnet having the opposite magnetic pole at the first face; and (iii) a second component positioned along the shaft and having a first face comprising a plurality of ferromagnetic extensions, wherein the first face of the first component is separated from the first face of the second component by a gap having a first distance, and wherein the first component and the second component are positioned such that a pair of the plurality of magnets interact via magnetic force with a respective one of the ferromagnetic extensions to reduce vibrations from a drivetrain to a housing portion of the personal care device, wherein the first distance is adjustable.

According to an embodiment, the second component is adjustably positioned along the shaft. According to an embodiment, the first component is adjustably positioned along the shaft.

According to an embodiment, the first and second components are substantially round. According to an embodiment, the plurality of magnets are positioned in a circle on the first face of the first component. According to an embodiment, the plurality of ferromagnetic extensions are positioned in a circle on the first face of the second component.

According to an embodiment, the drive train assembly comprises an adjustment mechanism configured to adjust the first distance. According to an embodiment, the adjustment mechanism is configured to be adjustable by a user of the personal care device.

Generally, in one aspect, is a personal care device. The personal care device includes a housing portion and a vibration reduction assembly, the vibration reduction assembly including: (i) a shaft; (ii) a first component positioned along the shaft and having a first face comprising a plurality of magnets, wherein the plurality of magnets are positioned to alternate between a magnet having a first magnetic pole at the first face and a magnet having the opposite magnetic pole at the first face; and (iii) a second component positioned along the shaft and having a first face comprising a plurality of ferromagnetic extensions, wherein the first face of the first component is separated from the first face of the second component by a gap having a first distance, and wherein the first component and the second component are positioned such that a pair of the plurality of magnets interact via magnetic force with a respective one of the ferromagnetic extensions to reduce vibrations from a drivetrain to the housing portion, wherein the first distance is adjustable.

Generally in one aspect, a vibration reduction assembly for a personal care device is provided. The vibration reduction assembly includes: (i) a first component having a first face comprising a plurality of magnets, wherein the plurality of magnets are positioned to alternate between a magnet having a first magnetic pole at the first face and a magnet having the opposite magnetic pole at the first face; (ii) a second component having a first face comprising a plurality of ferromagnetic extensions, wherein the first face of the first component is separated from the first face of the second component by a gap having a first distance, and wherein the first component and the second component are positioned such that a pair of the plurality of magnets interact via magnetic force with a respective one of the ferromagnetic extensions to reduce vibrations from a drivetrain to a housing portion of the personal care device; and (iii) an adjustment mechanism configured to adjust the first distance, the adjustment mechanism configured to be adjustable by a user of the personal care device.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a device for a vibration reduction assembly for an electric personal care device. More generally, Applicant has recognized and appreciated that it would be beneficial to provide a vibration reduction assembly capable of adjusting to the unique operating frequency of the electric personal care device. Accordingly, the systems described or otherwise envisioned herein provide a personal care device, such as an electric toothbrush or shaver, with a vibration reduction assembly comprising an adjustable vibration absorber. The vibration reduction assembly comprises a first component having a radial magnetization pattern of alternating poles, and a second component comprising a ferromagnetic material with a radial pole structure. The first component and the second component are separated by an air gap having an adjustable distance, where adjusting the air gap adjusts or fine tunes the stiffness of the rotational magnet and thus adjusts or fine tunes the vibration cancellation mechanism A particular goal of utilization of the embodiments and implementations herein is to provide an assembly for an oral cleaning device such as, e.g., a Philips Sonicare™ toothbrush (manufactured by Koninklijke Philips Electronics, N.V.), although the assembly may be utilized with many other personal care devices, including tongue scrapers, flossers, shavers, face cleansers, and many other devices.

Figure 1:
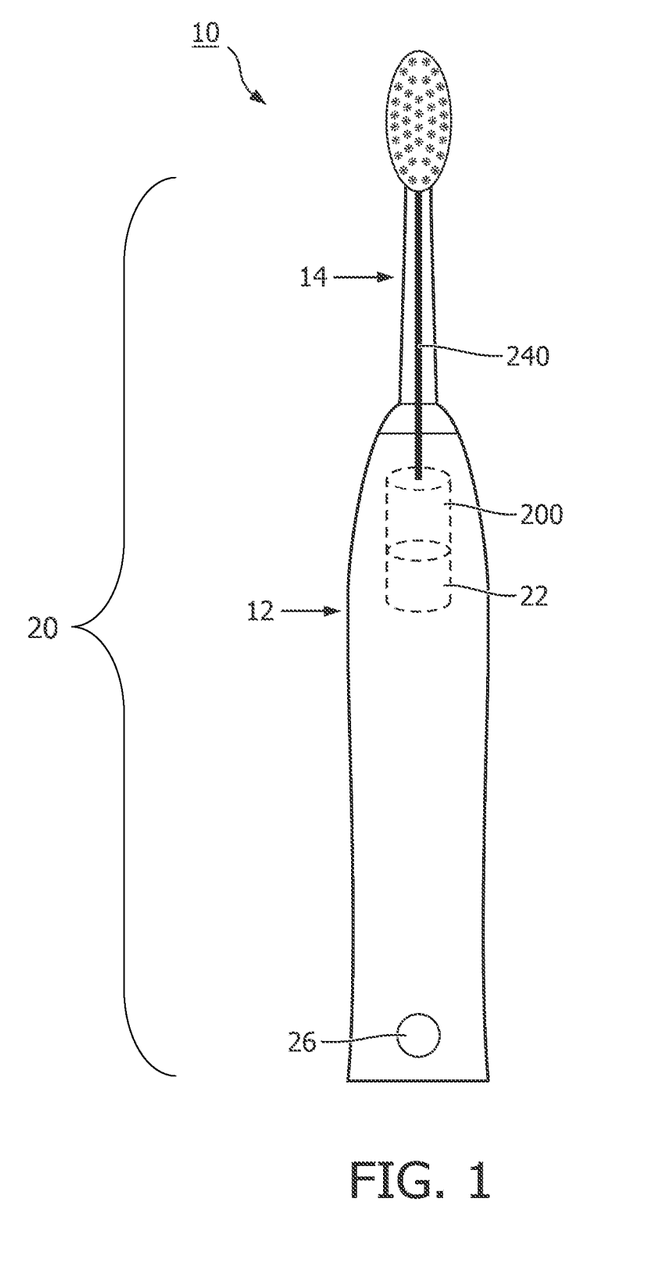
FIG. 1 is a schematic representation of a personal care device, in accordance with an embodiment.

Referring to FIG. 1, in one embodiment, a personal care device 10 is provided that includes a body portion 20 with a housing portion 12 and a head member 14 mounted on the body portion 20. Head member 14, is mounted so as to be able to move relative to the body portion 20. The movement can be any of a variety of different movements, including oscillation, vibration, or rotation, among others. The head member 14 can be fixedly mounted onto body portion 20, or it may alternatively be detachably mounted so that head member 14 can be replaced with a new one when a component of the head member is worn out and require replacement.

The body portion housing 12 contains a movement generator 22 for generating movement and a transmission component 240, or shaft, for transmitting the generated movements to head member 14. For example, the movement generator 22 can comprise a drivetrain, a motor or electromagnet(s) that generates movement of a shaft 240, which is subsequently transmitted to the head member 14. Movement generator 22 can include components such as a power supply, an oscillator, and one or more electromagnets, among other components. The power supply can comprise one or more rechargeable batteries, not shown, which can, for example, be electrically charged in a charging holder in which personal care device 10 is placed when not in use. The body portion housing further contains a vibration reduction assembly 200 comprising an adjustable vibration absorber configured to reduce unwanted vibration.

The body portion 20 is further provided with a user input 26 to activate and de-activate movement generator 22. The user input 26 allows a user to operate the personal care device 10, for example to turn the personal care device 10 on and off. The user input 26 may, for example, be a button, touch screen, or switch.

Figure 2:
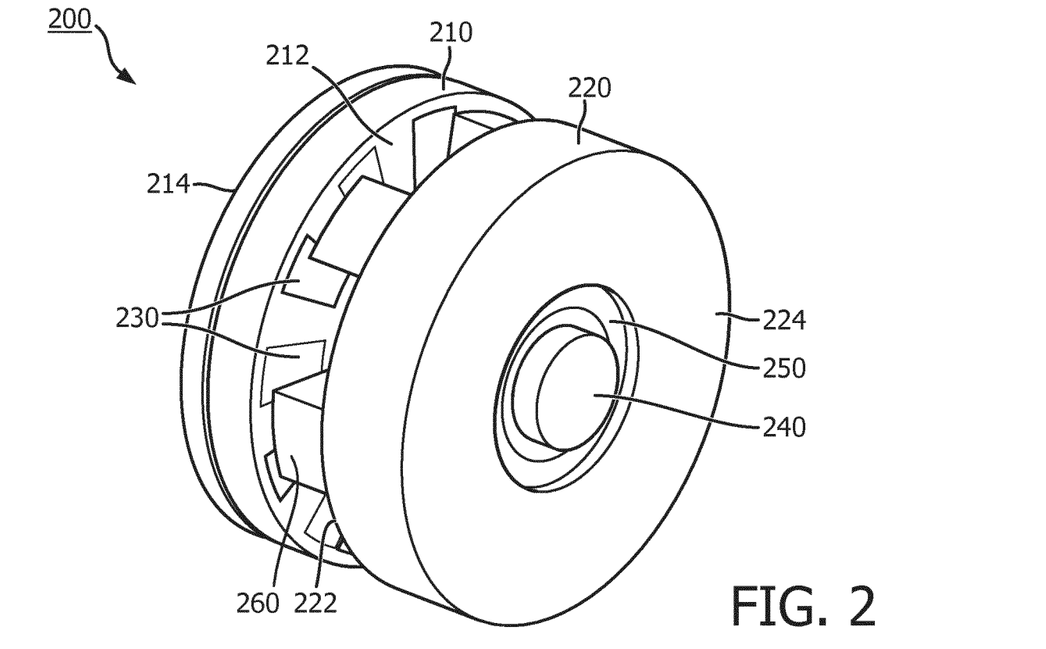
FIG. 2 is a schematic representation of a vibration reduction assembly of a personal care device, in accordance with an embodiment.
Figure 3:
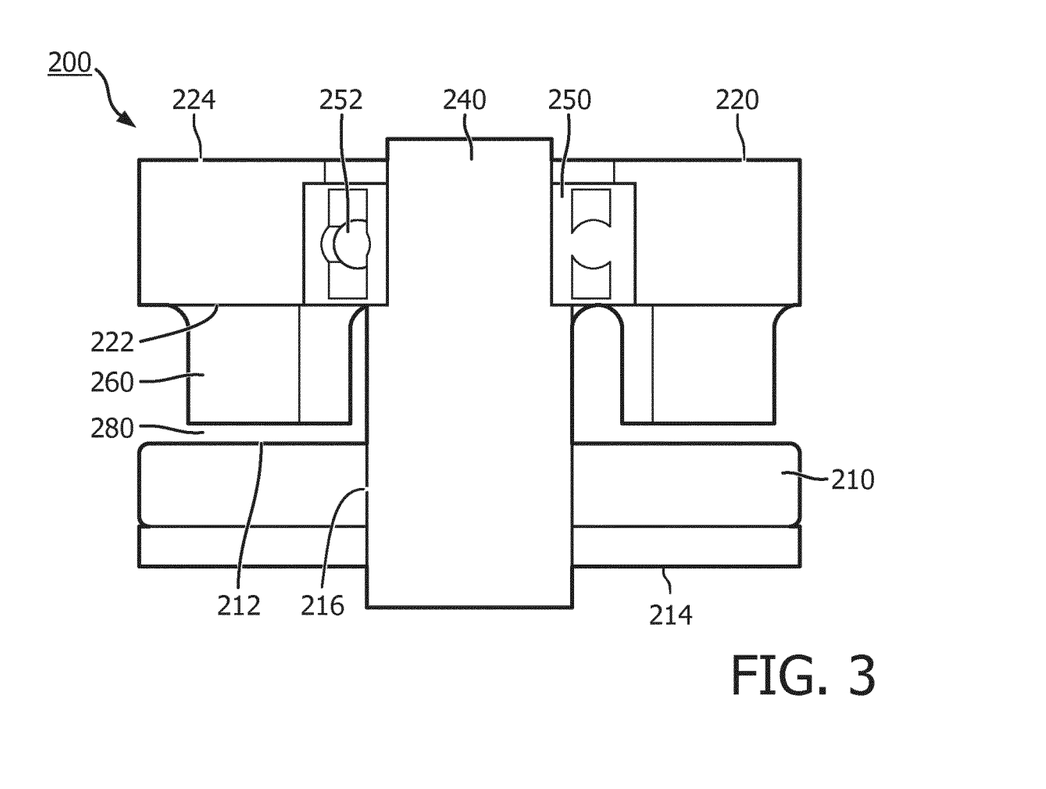
FIG. 3 is a cutaway view of a vibration reduction assembly of a personal care device, in accordance with an embodiment.

Referring to FIG. 2, in one embodiment, is a portion of a vibration reduction assembly 200 of a personal care device 10. Vibration reduction assembly 200 comprises a first component 210 having a radial magnetization pattern of alternating poles 230. The first component 210 has a magnetized side 212 with the radial magnetization pattern of alternating poles, and a reverse side 214. The vibration reduction assembly further includes a second component 220 comprising a ferromagnetic material with a radial pole structure. The second component 220 has a first side 222 and a reverse side 224, where at least the first side comprises a ferromagnetic material with a radial pole structure. The first side 222 of the second component 220 faces the magnetized side 212 of the first component 210. According to an embodiment, the vibration reduction assembly further comprises a shaft 240 surrounded by an adjustment device 250 to allow for adjustment of the distance between the first component and the second component. In this embodiment, the shaft 240 is adjustably connected by the adjustment device 250 to the second component 220. The adjustment device 250 comprises a plurality of ball bearings 252 or leaf springs, as shown in FIG. 3, which facilitate the connection between the second component 220 and the shaft 240. For example, with an adjustment device 250 comprising ball bearings 252, the attractive force between magnets and poles provides a pre-load that prevents a rattling of the ball bearing. The second component 220 may also comprise a plurality of extensions 260 extending from the first side 222 toward the magnetized side 212 of first component 210. Although shown as circular in FIG. 2, first component 210 and/or second component 220 can be a variety of shapes and sizes.

Figure 4:
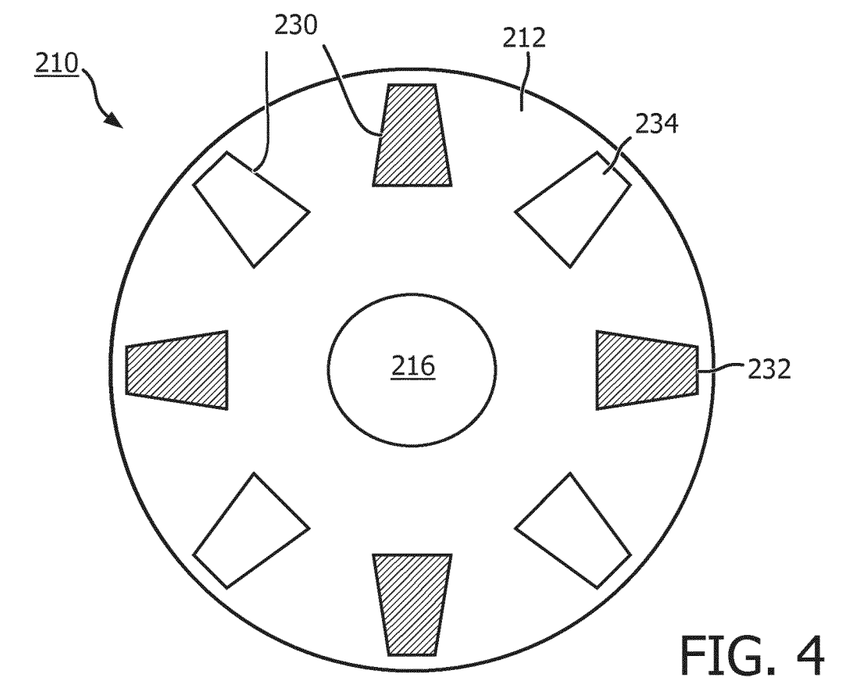
FIG. 4 is a schematic representation of a portion of a vibration reduction assembly, in accordance with an embodiment.

Referring to FIG. 3, in one embodiment, is a schematic representation of a top cutaway view of vibration reduction assembly 200 of a personal care device 10. Vibration reduction assembly 200 comprises a first component 210 with a magnetized side 212 with a radial magnetization pattern of alternating poles, and a reverse side 214. According to an embodiment, the first component 210 comprises or defines an opening 216, as shown in FIG. 4, that allows the shaft 240 to traverse the component. The vibration reduction assembly 200 further includes a second component 220 comprising a ferromagnetic material with a radial pole structure. The second component 220 has a first side 222 and a reverse side 224, where at least the first side comprises a ferromagnetic material with a radial pole structure. The first side 222 of the second component 220 faces the magnetized side 212 of the first component 210. According to an embodiment, the vibration reduction assembly comprises a shaft 240 which is adjustably connected by the adjustment device 250 to the second component 220. The second component may also comprise a plurality of extensions 260 extending from the first side 222 toward the magnetized side 212 of first component 210.

As shown in FIG. 3, the magnetized side 212 of first component 210 and the first side 222 of the second component 220 are positioned opposite each other, or facing each other. However, the two components are positioned with an air gap 280 having a first distance between side 212 of first component 210 and first side 222 of the second component 220. The first distance of the air gap can be increased or decreased by moving the first component 210 and/or the second component 220 relative to the other. As the air gap decreases, and side 212 of first component 210 approaches first side 222 of the second component 220, the magnetic attracting and repelling forces are greater and the vibration absorption is greater. As the air gap increases, and side 212 of first component 210 gets further away from first side 222 of the second component 220, the magnetic attracting and repelling forces are lessened and the vibration absorption is lessened. Fine-tuning the size of the air gap provides the fine-tuning capability of the vibration absorption system described or otherwise envisioned herein. The size of the air gap can be adjusted many different ways, including but not limited to moving the first component 210 along the shaft 240 closer to or further away from the second component 220, and/or moving the second component 220 closer to or further away from the first component 210.

Referring to FIG. 4, in one embodiment, is a schematic representation of the magnetized side 212 of first component 210. The first component comprises a radial magnetization pattern of alternating poles 230, where every other one of the poles 232 are a first magnetic pole, and the alternating poles 234 are the opposite magnetic pole. For example, poles 232 may be a north pole, and poles 234 may be a south pole, and vice versa. Although shown as approximately trapezoidal in FIG. 4, the poles 230 may be any shape or size, including square, round, triangular, rectangular, or any other shape or size.

Figure 5:
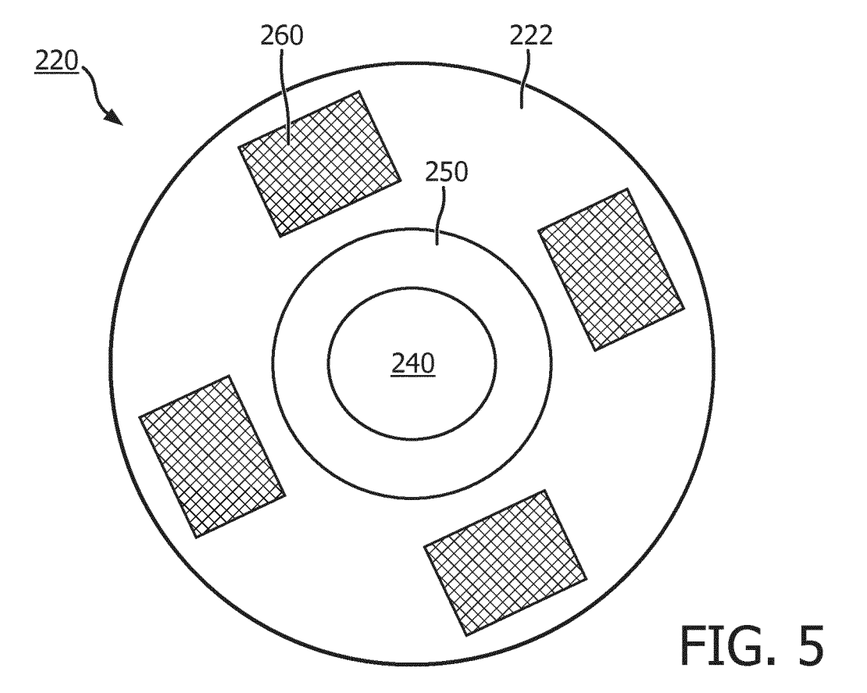
FIG. 5 is a schematic representation of a portion of a vibration reduction assembly, in accordance with an embodiment.

Referring to FIG. 5, in one embodiment, is a schematic representation of the first side 222 of second component 220. The second component comprises a plurality of extensions 260 extending outward from the first side 222 toward the magnetized side of the first component. At least the plurality of extensions 260 comprises a ferromagnetic material with a radial pole structure. According to an embodiment, the vibration reduction assembly further comprises a shaft 240 which is adjustably connected by an adjustment device or component 250 to the second component 220.

Figure 6:
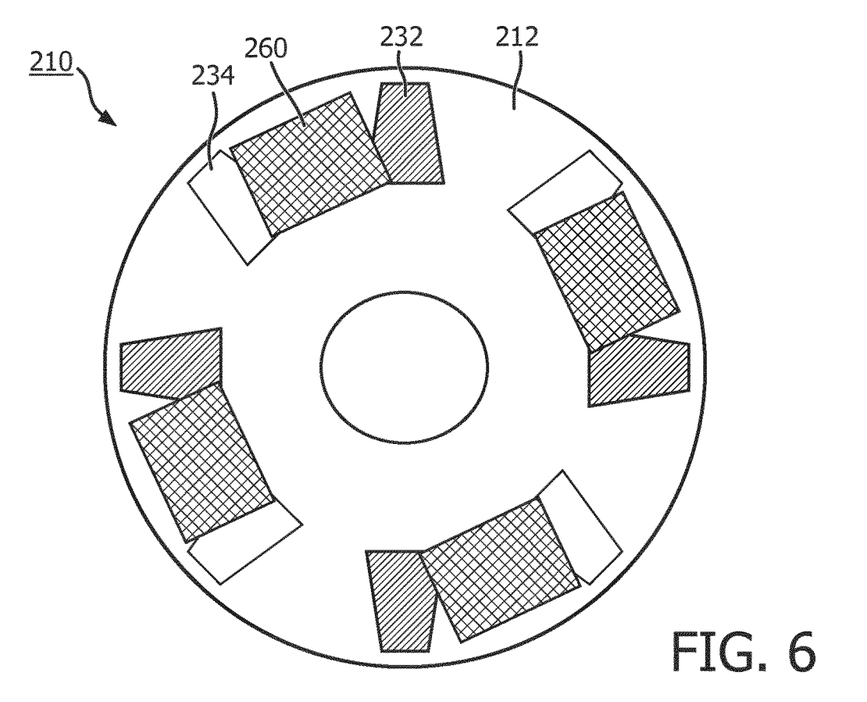
FIG. 6 is a schematic representation of a portion of a vibration reduction assembly, in accordance with an embodiment.

The extensions 260 extending from the first side 222 of the second component 220, which comprise a ferromagnetic material, align with the alternating poles 230 of the first component 210 such that attracting and repelling forces provide vibration absorption. Referring to FIG. 6, in one embodiment, is a schematic representation of magnetized side 212 of first component 210 with alternating poles 232, 234, with just the extensions 260 of the second component 220 shown in overlay. Although not shown in the figure, side 212 of first component 210 is separated from extensions 260 of second component 220 by air gap 280.

Figure 7:
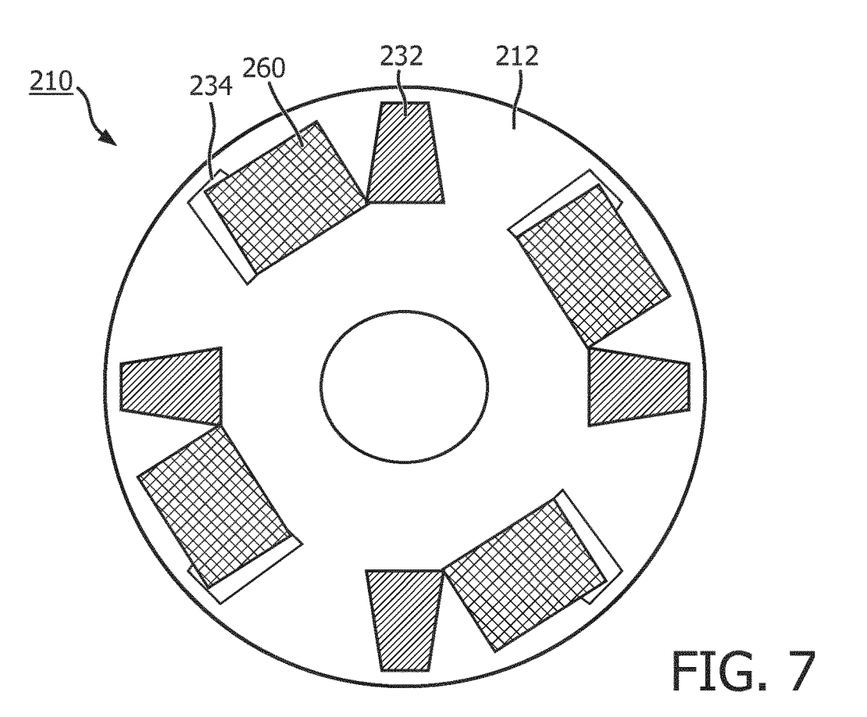
FIG. 7 is a schematic representation of a portion of a vibration reduction assembly, in accordance with an embodiment.
Figure 8:
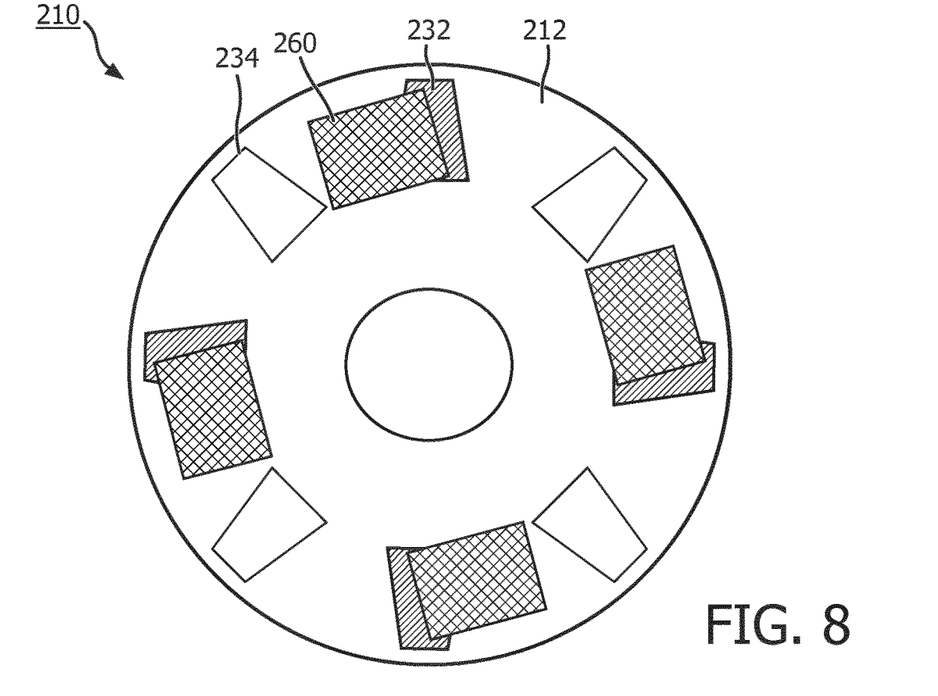
FIG. 8 is a schematic representation of a portion of a vibration reduction assembly, in accordance with an embodiment.

As shown in FIG. 6, each of the extensions 260 of second component 220 is aligned approximately between a set of alternating poles 232 and 234. This provides attracting and repelling forces to provide vibration absorption. As the shaft oscillates back and forth, the second component 220 will oscillate back and forth, causing the extensions 260 to oscillate back and forth. Since the first component is fixed in place, each of the extensions 260 will interact with the closest pole 230, which will attract or repel the extension. For example, as shown in FIG. 7, the second component 220 has rotated toward the left, and the plurality of extensions 260 are rotated closer to poles 234 where the pole will have an attracting or repelling magnetic force on the extension. In FIG. 8, the second component 220 has rotated toward the right, and the plurality of extensions 260 are rotated closer to poles 232 where the pole will have an attracting or repelling magnetic force on the extension. Accordingly, with the inertia in the motor, the pole structure comprises a resonance frequency that can be utilized to minimize unwanted vibrations.

Figure 9:
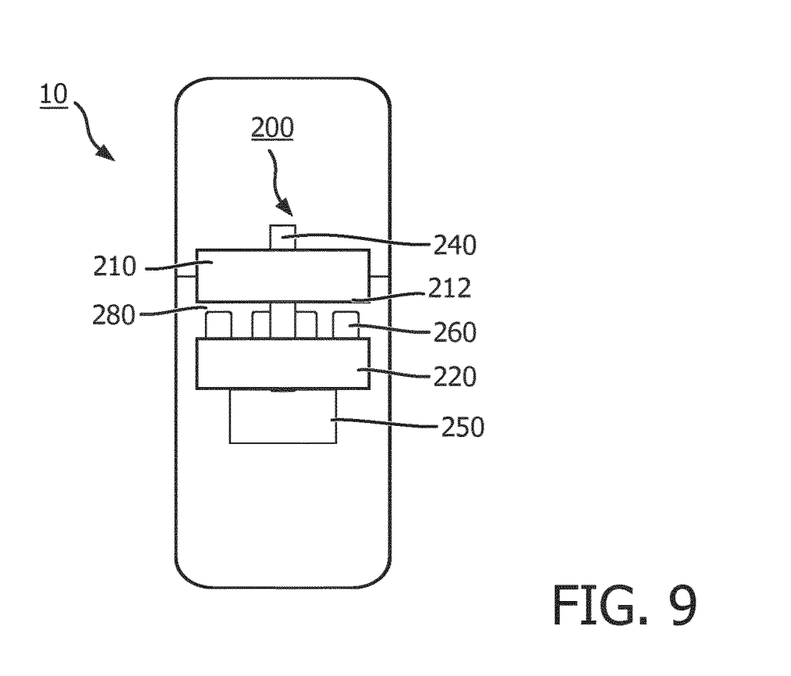
FIG. 9 is a schematic representation of a drivetrain assembly and a vibration reduction assembly of a personal care device, in accordance with an embodiment.

Referring to FIG. 9, in one embodiment, is a schematic representation of a personal care device 10 with a vibration reduction assembly 200 comprising a first component 210, a second component 220, and an adjustment device 250. In this embodiment, the shaft 240 is adjustably connected to the second component 220, and the second component 220 comprises a plurality of extensions 260 which face the magnetized side 212 of the first component 210. Side 212 of the first component 210 is separated by a gap 280 from the second component 220. First component 210 is fixedly attached to the housing 12 of the body portion.

According to an embodiment, the personal care device 10 comprises an adjustment device or component 250 which enables adjustment of the vibration absorber mechanism. The adjustment device or component 250 may be any mechanism or configuration that enables adjustment of the size of the air gap 280. For example, if first component 210 is fixedly attached to the housing 12, adjustment device or component 250 may adjust the placement of the second component 220 relative to first component 210, such as moving the second component along the shaft 240. For example, as shown in FIG. 3, the adjustment component 250 may comprise one or more ball bearings 252 or leaf springs that facilitate the connection between the second component 220 and the shaft 240. The ball bearings or leaf springs may be releasable or may otherwise be adjusted to allow the second component 220 to slide along the shaft 240. For example, the adjustment component 250 may comprise an actuator which is activated by the user to release the force exerted by the ball bearings on the shaft, and thus the second component is free to slide along the shaft. To enable fine-tuning, the adjustment component 250 may comprise a series of pre-set positions such that the user can move the actuator from one pre-set position to another pre-set position, with the second component moving either closer to or away from the first component. According to another embodiment, adjustment device or component 250 may adjust the placement of the first component relative to the second component. The adjustment device or component 250 may comprise any internal manipulator which can be part of a user interface. The system can communicate to the user a need to adjust the system through vibration levels, and the device can be adjusted while running at the same brushing amplitude.

According to an embodiment, the resonance frequency of the vibration reduction mechanism 200 can be tuned individually for each unique personal care device. For example, the proper setting can be determined by measuring the vibration level on the handle, while the device is running, and slowly adjusting the size of the air gap. Accordingly, there is no need to directly measure the adjustable vibration absorber's properties.

Figure 10:
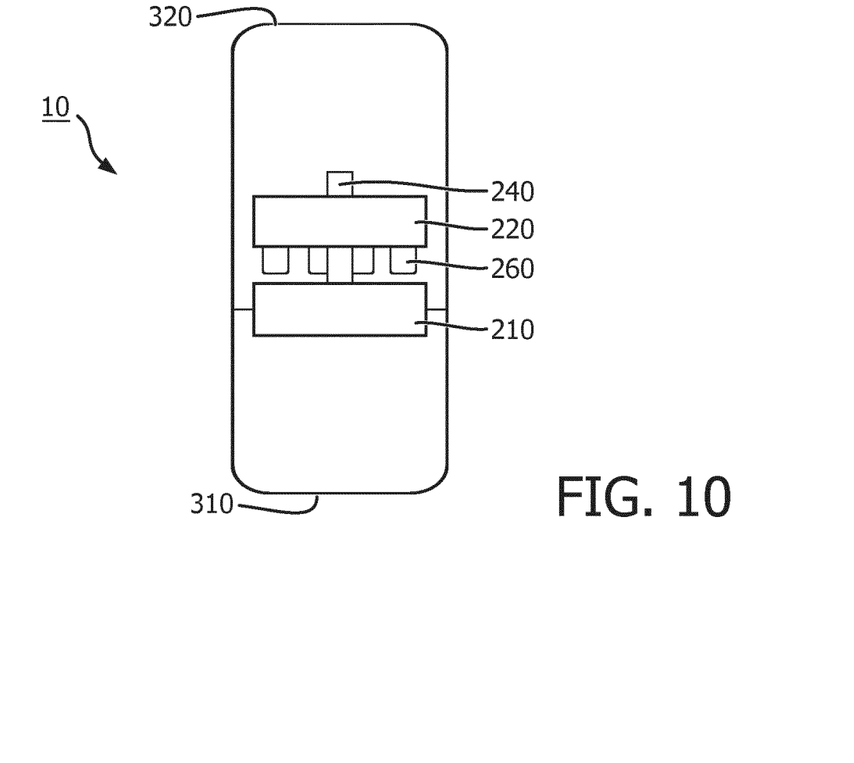
FIG. 10 is a schematic representation of a vibration reduction assembly of a personal care device, in accordance with an embodiment.

Many other configurations of the first component 210 and second component 220 are possible. For example, referring to FIG. 10 is an embodiment of personal care device 10 with first component 210 and second component 220. In this embodiment, the shaft 240 does not traverse the first component 210. Although second component 220 comprises a plurality of ferromagnetic extensions 260, these extensions face the bottom 310 of the device rather than facing the top 320 of the device as shown in FIG. 9. Accordingly, the magnetized face of the first component 210 faces the top 320 of the device so that the ferromagnetic extensions 260 of second component 220 face the magnetized face of the first component 210.

Figure 11:
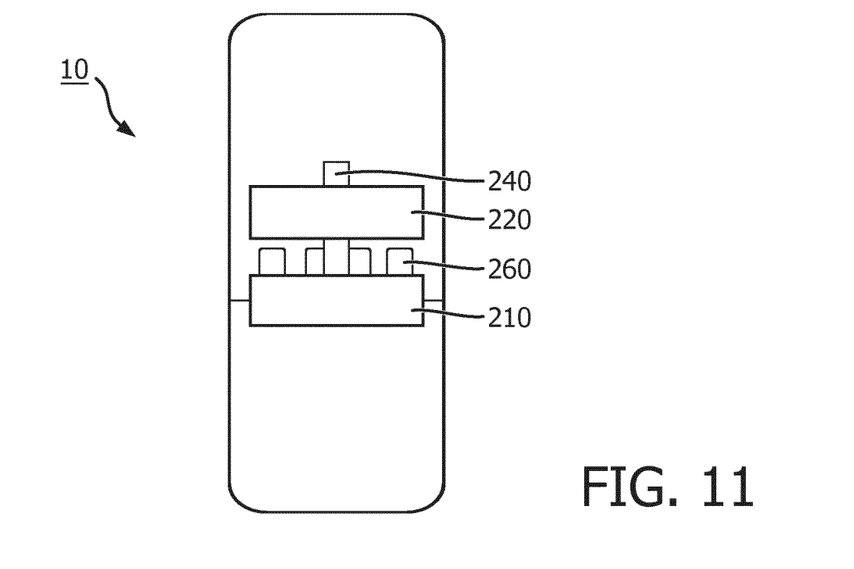
FIG. 11 is a schematic representation of a vibration reduction assembly of a personal care device, in accordance with an embodiment.
Figure 12:
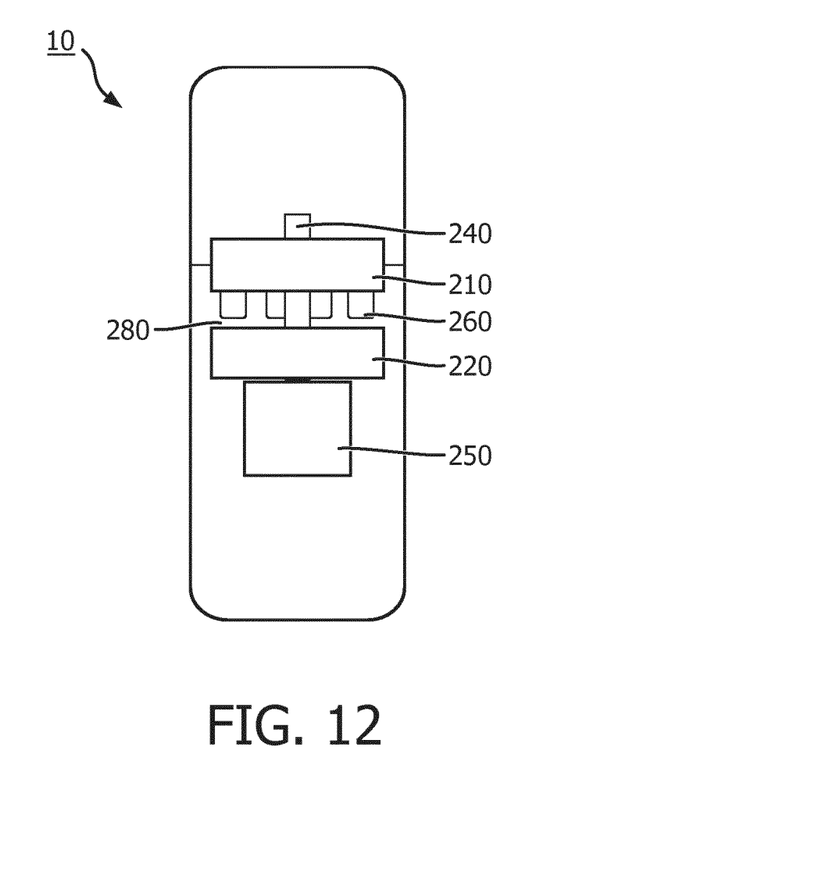
FIG. 12 is a schematic representation of a drivetrain assembly and a vibration reduction assembly of a personal care device, in accordance with an embodiment.

Referring to FIG. 11 is another embodiment of personal care device 10 with first component 210 and second component 220. In this embodiment, first component 210 comprises a plurality of ferromagnetic extensions 260, and second component 220 comprises a magnetized face with a radial magnetization pattern of alternating poles. Referring to FIG. 12 is another embodiment of personal care device 10 with first component 210 and second component 220. In this embodiment, first component 210 comprises a plurality of ferromagnetic extensions 260, and second component 220 comprises a magnetized face with a radial magnetization pattern of alternating poles. In this embodiment, the shaft 240 traverses the first component 210. Although the movement generator and vibration reduction mechanism is shown positioned in approximately the same place in the figures, the movement generator and vibration reduction mechanism can be positioned anywhere within the handle where it is convenient, where the air gap can be adjusted, and/or where placement is most effective at minimizing vibration. Vibration reduction functions regardless of the position of the vibration reduction mechanism in the housing, as long as the rotation axis is parallel to the rotation axis of the main movement of the toothbrush.

In one example, the resonator has resonance frequency of 257 Hz, which is the same as the oscillation frequency of the brush. This reduces handle vibration and, unexpectedly, also increases oscillation of the brush. According to an embodiment, vibration reduction is maximized when the damping in the resonator system is as low as possible. This may be achieved, for example, using lamellated iron, or a sintered structure with the grains electrically isolated. Internal losses by eddy currents are minimized, as is the damping of the motion.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding,"

"composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A vibration reduction assembly of a personal care device comprising:
    a shaft;
    a first component positioned along the shaft and having a first face comprising a plurality of magnets, wherein the plurality of magnets are positioned to alternate between a magnet having a first magnetic pole at the first face and a magnet having the opposite magnetic pole at the first face; and
    a second component positioned along the shaft and having a first face comprising a plurality of ferromagnetic extensions wherein the first face of the first component is separated from the first face of the second component by a gap having a first distance which is adjustable, wherein the first component and the second component are positioned such that a pair of the plurality of magnets interact via magnetic force with a respective one of the ferromagnetic extensions to reduce vibrations from a movement generator to a housing portion of the personal care device.

2. The vibration reduction assembly of claim 1, wherein the second component is adjustably positioned along the shaft.

3. The vibration reduction assembly of claim 1, wherein the first component is adjustably positioned along the shaft.

4. The vibration reduction assembly of claim 1, wherein the first and second components are substantially round.

5. The vibration reduction assembly of claim 4, wherein the plurality of magnets are positioned approximately equally spaced in a circle on the first face of the first component.

6. The vibration reduction assembly of claim 4, wherein the plurality of ferromagnetic extensions are positioned approximately equally spaced in a circle on the first face of the second component.

7. The vibration reduction assembly of claim 1, wherein the vibration reduction assembly further comprises an adjustment mechanism configured to adjust the first distance.

8. The vibration reduction assembly of claim 7, wherein the adjustment mechanism is configured to be adjustable by a user of the personal care device.

9. The vibration reduction assembly of claim 7, wherein the shaft is adjustably connected by the adjustment mechanism to the second component.

10. A personal care device comprising:
    a housing portion containing a vibration reduction assembly comprising:
        a shaft;
        a first component positioned along the shaft and having a first face comprising a plurality of magnets wherein the plurality of magnets are positioned to alternate between a magnet having a first magnetic pole at the first face and a magnet having the opposite magnetic pole at the first face; and
        a second component positioned along the shaft and having a first face comprising a plurality of ferromagnetic extensions wherein the first face of the first component is separated from the first face of the second component by a gap having a first distance which is adjustable, and wherein the first component and the second component are positioned such that a pair of the plurality of magnets interact via magnetic force with a respective one of the ferromagnetic extensions to reduce vibrations from a drivetrain to the housing portion.

11. The personal care device of claim 10, wherein the first component is mounted to the housing portion.

12. The personal care device of claim 10, wherein the second component is adjustably positioned along the shaft.

13. The personal care device of claim 10, wherein the plurality of magnets are positioned approximately equally spaced in a circle on the first face of the first component.

14. The personal care device of claim 10, wherein the plurality of ferromagnetic extensions are positioned approximately equally spaced in a circle on the first face of the second component.

15. The personal care device of claim 10, wherein the vibration reduction assembly comprises an adjustment mechanism configured to adjust the first distance, the adjustment mechanism configured to be adjustable by a user of the personal care device.

16. The personal care device of claim 15 wherein the shaft is adjustably connected by the adjustment mechanism to the second component.

17. The personal care device of claim 16 wherein the adjustment mechanism includes a ball bearing.

18. The personal care device of claim 16 wherein the adjustment mechanism includes a leaf spring.

19. A vibration reduction assembly of a personal care device comprising:
    a first component having a first face comprising a plurality of magnets, wherein the plurality of magnets are positioned to alternate between a magnet having a first magnetic pole at the first face and a magnet having the opposite magnetic pole at the first face;
    a second component having a first face comprising a plurality of ferromagnetic extensions, wherein the first face of the first component is separated from the first face of the second component by a gap having a first distance, and wherein the first component and the second component are positioned such that a pair of the plurality of magnets interact via magnetic force with a respective one of the ferromagnetic extensions to reduce vibrations from a drivetrain to a housing portion of the personal care device; and an adjustment mechanism configured to adjust the first distance, the adjustment mechanism configured to be adjustable by a user of the personal care device.

20. The vibration reduction assembly of claim 19 wherein the personal care device is a power toothbrush.

\* \* \* \* \*